(12) United States Patent
Kim

(10) Patent No.: US 11,689,494 B2
(45) Date of Patent: Jun. 27, 2023

(54) DATA TRANSCEIVING DEVICE AND METHOD IN REPEATER APPARATUS

(71) Applicant: SK TELECOM CO., LTD., Seoul (KR)

(72) Inventor: Sung Jin Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 17/284,630

(22) PCT Filed: May 14, 2020

(86) PCT No.: PCT/KR2020/006345
§ 371 (c)(1),
(2) Date: Apr. 12, 2021

(87) PCT Pub. No.: WO2021/080106
PCT Pub. Date: Apr. 29, 2021

(65) Prior Publication Data
US 2022/0150213 A1    May 12, 2022

(30) Foreign Application Priority Data
Oct. 22, 2019 (KR) ........................ 10-2019-0131602

(51) Int. Cl.
*H04L 61/2517*    (2022.01)
*H04L 61/2521*    (2022.01)
(Continued)

(52) U.S. Cl.
CPC ...... *H04L 61/2517* (2013.01); *H04L 61/2525* (2013.01); *H04L 61/2567* (2013.01); *H04W 8/26* (2013.01); *H04W 40/24* (2013.01)

(58) Field of Classification Search
None
See application file for complete search history.

(56) References Cited

U.S. PATENT DOCUMENTS 10,412,122 B1 *  9/2019  Olofsson ............. H04L 61/2514
10,911,532 B1 *  2/2021  Zhang ................. H04L 65/1069
(Continued)

FOREIGN PATENT DOCUMENTS

KR    10-2002-0007477    1/2002
KR    10-2003-0006625    1/2003
(Continued)

OTHER PUBLICATIONS

Korean Office Action dated May 31, 2021 issued in Application No. 10-2019-0131602.
(Continued)

*Primary Examiner* — Lonnie V Sweet
(74) *Attorney, Agent, or Firm* — Ked & Associates LLP

(57) ABSTRACT

A data transceiver device in a repeater according to an exemplary embodiment includes: a radio unit assigned with a unique port number for uniquely identifying the radio unit and a layer splitter connected to the radio unit; a transfer unit configured to transfer an inbound packet to the layer splitter identified by the unique port number when the inbound packet including the unique port number as an internal port number is received; and the layer splitter configured to transfer the inbound packet to the radio unit corresponding to the unique port number when the inbound packet is received through transfer unit.

5 Claims, 4 Drawing Sheets

(51) Int. Cl.
*H04L 61/2567* (2022.01)
*H04W 8/26* (2009.01)
*H04W 40/24* (2009.01)

(56) References Cited

U.S. PATENT DOCUMENTS

| | | | | |
|---|---|---|---|---|
| 2016/0219017 | A1* | 7/2016 | Kölhi | H04L 61/2015 |
| 2017/0180484 | A1 | 6/2017 | Asveren et al. | |
| 2019/0297113 | A1* | 9/2019 | Yang | H04L 63/1408 |
| 2020/0374264 | A1* | 11/2020 | Lin | H04L 61/2503 |

FOREIGN PATENT DOCUMENTS

| | | |
|---|---|---|
| KR | 10-2004-0105301 | 12/2004 |
| KR | 10-2008-0005301 | 1/2008 |
| KR | 10-2008-0051681 | 6/2008 |
| KR | 10-2016-0111829 | 9/2016 |

OTHER PUBLICATIONS

International Search Report dated Sep. 3, 2020 issued in Application No. PCT / KR2020 / 006345.
5G non-official translation (Technical Specifications for 5G Major Equipment and Repeater Suppliers). Mar. 30, 2019.
Yamagata Y Shirasaki NTT Communications A Nakagawa Japan Internet Exchange (JPIX) J Yamaguchi Fiber 26 Network H Ashida Is Consult: "NAT444; draft-shirasaki-nat444-06.txt", Internet Engineering Task Force, IETF; Standardworkingdraft, Internet Society (ISOC) 4, Rue Des Falaises CH-1205 Geneva, Switzerland, Jul. 5, 2012 (Jul. 5, 2012), pp. 1-10, XP015083756.
Arko Ericsson M Townsley Cisco J: "IPv4 Run-Out and IPv4-IPv6 Co-Existence Scenarios; rfc617.txt", Internet Engineering Task Force, IETF; Standard, Internet Society (ISOC) 4, Rue Des Falaises CH-1205, Geneva, Switzerland, May 26, 2011 (May 26, 2011), pp. 1-20, XP015076020.
Donley C et al: "Assessing the Impact of Carrier-Grade NAT on Network Applications; rfc7021.txt", Internet Engineering Task Force, IETF; Standard, Internet Society (ISOC) 4, Rue Des Falaises CH-1205, Geneva, Switzerland, Sep. 20, 2013 (Sep. 20, 2013), pp. 1-29, XP015094953.
Srisuresh Jasmine Networks K Egevang Intel 1-11 Corporation P: "Traditional IP Network Address Translator (Traditional NAT); rfc3022.txt", Internet Engineering Task Force, IETF; Standard, Internet Society (ISOC) 4, Rue Des Falaises CH-1205, Geneva, Switzerland, Jan. 1, 2001 (Jan. 1, 2001), XP015008805.
Srisuresh M Holdrege Lucent Technologies P: "IP Network Address Translator (NAT) Terminology and Considerations; rfc2663.txt", Internet Engineering Task Force, IETF; Standard, Internet Society (ISOC) 4, Rue Des Falaises CH-1205, Geneva, Switzerland, Aug. 1, 1999 (Aug. 1, 1999), XP015008446.
European Search Report dated Sep. 16, 2021 issued in Application No. 20743947.2.

\* cited by examiner

FIG. 2A

| LS (index) | RU Port range |
|---|---|
| 1 | 0x6000~0x603F |
| 2 | 0x6100~0x613F |
| 3 | 0x6200~0x623F |
| 4 | 0x6300~0x633F |
| 5 | 0x6400~0x643F |
| 6 | 0x6500~0x653F |
| 7 | 0x6600~0x663F |
| 8 | 0x6700~0x673F |
| 9 | 0x6800~0x683F |
| 10 | 0x6900~0x693F |
| 11 | 0x6A00~0x6A3F |
| 12 | 0x6B00~0x6B3F |
| 13 | 0x6C00~0x6C3F |
| 14 | 0x6D00~0x6D3F |
| 15 | 0x6E00~0x6E3F |
| 16 | 0x6F00~0x6F3F |
| 17 | 0x7000~0x703F |
| 18 | 0x7100~0x713F |

Layer Splitter (Cell Number)

Cascade Number

| LS#1(0x6000~0x603F) | | | | |
|---|---|---|---|---|
| Port | RU1 | RU2 | RU3 | RU4 |
| 1 | 0x6000 | 0x6001 | 0x6002 | 0x6003 |
| 2 | 0x6004 | 0x6005 | 0x6006 | 0x6007 |
| 3 | 0x6008 | 0x6009 | 0x600A | 0x600B |
| 4 | 0x600C | 0x600D | 0x600E | 0x600F |
| 5 | 0x6010 | 0x6011 | 0x6012 | 0x6013 |
| 6 | 0x6014 | 0x6015 | 0x6016 | 0x6017 |
| 7 | 0x6018 | 0x6019 | 0x601A | 0x601B |
| 8 | 0x601C | 0x601D | 0x601E | 0x601F |
| 9 | 0x6020 | 0x6021 | 0x6022 | 0x6023 |
| 10 | 0x6024 | 0x6025 | 0x6026 | 0x6027 |
| 11 | 0x6028 | 0x6029 | 0x602A | 0x602B |
| 12 | 0x602C | 0x602D | 0x602E | 0x602F |
| 13 | 0x6030 | 0x6031 | 0x6032 | 0x6033 |
| 14 | 0x6034 | 0x6035 | 0x6036 | 0x6037 |
| 15 | 0x6038 | 0x6039 | 0x603A | 0x603B |
| 16 | 0x603C | 0x603D | 0x603E | 0x603F |

Port Number

D2

DATA TRANSCEIVING DEVICE AND METHOD IN REPEATER APPARATUS

CROSS-REFERENCE TO RELATED PATENT APPLICATIONS

This application is a U.S. National Stage Application under 35 U.S.C. § 371 of PCT Application No. PCT/KR2020/006345, filed May 14, 2020, which claims priority to Korean Patent Application No. 10-2019-0131602, filed Oct. 22, 2019, whose entire disclosures are hereby incorporated by reference.

TECHNICAL FIELD

The present disclosure relates to a technology for transmitting and receiving data and, more particularly, to an apparatus and method of transmitting and receiving data in a RF repeater using a network address port translation (NAPT) technique.

BACKGROUND

A radio frequency (RF) repeater is a radio communications apparatus providing an in-building service. A conventional repeater used for a WCDMA or an LTE network, for example, has a structure in which an RF signal of a base station channel is duplicated utilizing a repeater matching device and the duplicated RF signal is transmitted by the repeater. Conventionally, a control of an individual LTE repeater is carried out in such a manner that the LTE repeater is interfaced to an LTE repeater Element Management System (EMS) by a separate communication link, and the LTE repeater is monitored and controlled through the LTE repeater EMS. Such a network configuration is disadvantageous in that operation of multiple repeaters requires an allocation of lots of Internet Protocol (IP) resources.

SUMMARY

To solve the above problem, provided are a device and a method for transmitting and receiving data in a repeater apparatus which enable a plurality of the radio units to separately communicate with external devices without assigning an IP address to each of the plurality of the radio units.

According to an aspect of an exemplary embodiment, a data transceiver device includes: a radio unit assigned with a unique port number for uniquely identifying the radio unit and a layer splitter connected to the radio unit; a transfer unit configured to transfer an inbound packet to the layer splitter identified by the unique port number when the inbound packet including the unique port number as an internal port number is received; and the layer splitter configured to transfer the inbound packet to the radio unit corresponding to the unique port number when the inbound packet is received through transfer unit.

The unique port number may be assigned according to a cell number corresponding to the layer splitter, an internal port number to which the layer splitter and the radio unit are connected, and a cascade number.

The transfer unit may have a representative IP address known to outside of the data transceiver device. When receiving the inbound packet including the representative IP address as a destination IP address and the unique port number as the internal port number, the transfer unit may change the destination IP address in the inbound packet from the representative IP address to an internal IP address of the layer splitter to transfer an adjusted inbound packet to the layer splitter.

The radio unit may have an internal IP address and an internal port number used for actual communication with the layer splitter. When receiving the adjusted inbound packet from the transfer unit, the layer splitter may change the destination IP address and the internal port number in the adjusted inbound packet to the internal IP address and the internal port number, respectively, of the radio unit corresponding to the unique port number to transfer a re-adjusted inbound packet to the radio unit.

When receiving an outbound packet generated by the radio unit and having an internal IP address and an internal port number used for actual communication with the layer splitter as a source IP address and a source port number, respectively, the layer splitter may change the source port number in the outbound packet to the unique port number to transfer an adjusted outbound packet to the transfer unit. The transfer unit may change the source IP address in the adjusted outbound packet into a representative IP address to transmit a re-adjusted outbound packet to outside of the data transceiver device.

According to an aspect of another exemplary embodiment, a method of transmitting and receiving data includes: receiving, by a transfer unit, an inbound packet including a unique port number for uniquely identifying a radio unit and a layer splitter connected to the radio unit as an internal port number; transferring, by the transfer unit, the inbound packet to a layer splitter identified by the unique port number; and transferring, by the layer splitter, the inbound packet to a radio unit corresponding to the unique port number.

The unique port number may be assigned according to a cell number corresponding to the layer splitter, an internal port number to which the layer splitter and the radio unit are connected, and a cascade number.

The inbound packet received by the transfer unit may include a representative IP address known to an outside as a destination IP address and the unique port number as the internal port number.

The operation of transferring the inbound packet to the layer splitter may include: changing the destination IP address in the inbound packet from the representative IP address to an internal IP address of the layer splitter; and transferring an adjusted inbound packet to the layer splitter.

The operation of transferring the inbound packet to the radio unit may include: changing the destination IP address and the internal port number in the adjusted inbound packet to an internal IP address and an internal port number, respectively, of the radio unit corresponding to the unique port number; and transferring a re-adjusted inbound packet to the radio unit.

The method of transmitting and receiving data may further include: generating, by the radio unit, an outbound packet having an internal IP address and an internal port number used for actual communication with the layer splitter as a source IP address and a source port number, respectively, and transmitting the outbound packet; changing, by the layer splitter, the source port number in the outbound packet to the unique port number and transferring an adjusted outbound packet to the transfer unit; and changing, by the transfer unit, the source IP address in the adjusted outbound packet into a representative IP address and transmitting a re-adjusted outbound packet to an outside.

According to the present disclosure, a unique port number is assigned to each of a plurality of the radio units so that the radio unit and a layer splitter connected to the radio unit can be identified with reference to a network address port translation table. A representative IP address of a transfer unit and the unique port number may be used as address information indicating locations of the plurality of the radio units during communications with external devices. Also, packets can be routed in the repeater apparatus by using an internal IP address of the layer splitter and an internal IP address of the radio unit corresponding to the unique port number, and the internal port number of the port connecting between the layer splitter and the radio unit. Therefore, the present disclosure can cope with the IP address exhaustion problem by allowing to discriminate a plurality of the radio units 300 during the communication using only a single IP address, i.e., the representative IP address. Also, the management device 10 can efficiently use the IP resources and manage the plurality of the radio units 300 separately through the use of only a single IP address and the unique port numbers.

BRIEF DESCRIPTION OF THE DRAWINGS

In order that the disclosure may be well understood, there will now be described various forms thereof, given by way of example, reference being made to the accompanying drawings, in which:

FIGS. 2A and 2B illustrate a network address port translation (NAPT) table according to an exemplary embodiment of the present disclosure;

Figure 1:
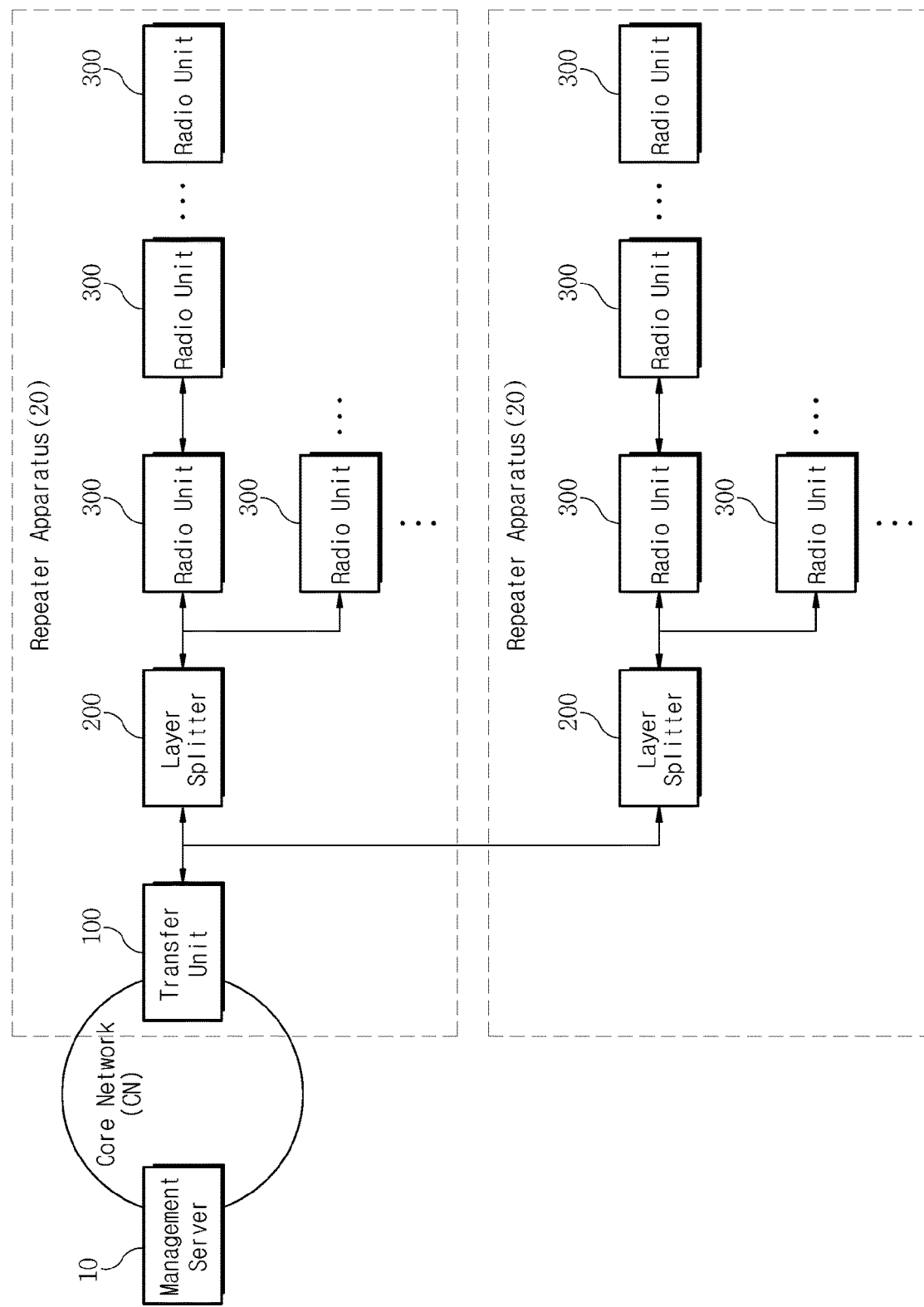
FIG. 1 illustrates a configuration of a communications network according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. In the following description and the accompanied drawings, detailed descriptions of well-known functions or configuration that may obscure the subject matter of the present disclosure will be omitted for simplicity. The exemplary embodiments described in this specification and the configurations shown in the drawings are not intended to limit the technical idea of the present disclosure, and thus it should be understood that there may exist various equivalents and modifications which may substitute the exemplary embodiments within the scope of the present disclosure.

When a component is referred to as being "connected" or "coupled" to another component, it means that the component is connected or may be connected logically or physically to the other component. In other words, it is to be understood that the component or may be connected or coupled to the other component indirectly through an object therebetween instead of being directly connected or coupled to the other component.

The terminologies are used herein for the purpose of describing particular embodiments only and are not intended to limit the disclosure. The singular forms include plural referents unless the context clearly dictates otherwise. Also, the expressions "~ comprises," "~ includes," "~ constructed," "~ configured" are used to refer a presence of a combination of enumerated features, numbers, processing steps, operations, elements, or components, but are not intended to exclude a possibility of a presence or addition of another feature, number, processing step, operation, element, or component.

It is to be noted that the same components or components having similar functions or operations are designated by the same reference numerals throughout the drawings, and repetitive descriptions thereof will be omitted. In addition, detailed descriptions of well-known functions or configuration that may obscure the subject matter of the present disclosure may be omitted for simplicity or be illustrated by a block diagram focusing on core functions of each structure and device.

First, a configuration of a communications network according to an exemplary embodiment of the present disclosure will be described with reference to attached drawings. FIG. 1 illustrates a configuration of a communications network according to an exemplary embodiment of the present disclosure, and FIG. 2 illustrates a network address port translation (NAPT) table according to an exemplary embodiment of the present disclosure.

Referring to FIG. 1, a communications network according to an exemplary embodiment of the present disclosure includes a management server 10 and a repeater apparatus 20. Further, the repeater apparatus 20 may include a transfer unit 100, a layer splitter 200, and a radio unit 300. The transfer unit 100 may be a higher layer distributed unit (DU_H), and the radio unit 300 may be a lower layer distributed unit (DU_L) or a radio remote unit (RRU).

The management server 10 manages the repeater apparatus 20. In particular, the management server 10 manages each of the radio units 300 separately. The management server 10 may implemented based on an Element Management System (EMS), a 5G Repeater Element Management System (gREMS), or a Network Management System (NMS).

According to an exemplary embodiment of the present disclosure, the management server 10 may communicate with the repeater apparatus 20 with reference to a network address port translation table. FIG. 2 shows an example of the network address port translation table.

The network address port translation table maintains unique port numbers which enable to discriminate each of the radio units 300 from the other radio units. In FIG. 2, it is assumed that eighteen layer splitters 200 are connected to one transfer unit 100, and four radio units 300 are connected to each of the sixteen ports of each layer splitter 200 through respective cascade connections so that a total of sixty four radio units 300 are connected to each of the layer splitters 200.

The network address port translation table includes one layer splitter table shown in portion (A) of FIG. 2 and a plurality of radio unit tables shown in portion (B) of FIG. 2.

The layer splitters 200 are provided to correspond to cell numbers 1 to 18 of a base station, and the layer splitter table (A) is used for identifying the layer splitters 200 corresponding to the cell number. The layer splitter table (A) provides layer splitter indexes LS #1-18 corresponding to the cell numbers 1-18.

Each of the plurality of radio unit tables B are provided to correspond to each of the layer splitter indexes LS #1-18. In the plurality of radio unit tables (B), unique port numbers are assigned to the radio units 300 connected to the layer splitter 200.

As mentioned above, four radio units 300 are connected to each of the sixteen ports of each layer splitter 200 through respective cascade connections, so that a total of 64 radio units 300 are connected to each of the layer splitters 200. Accordingly, the unique port number is assigned according to the cell number 1-18 for distinguishing the layer splitter 200, the port number 1-16 of the port of the layer splitter 200 to which the radio unit 300 is connected, and a cascade number RU1, RU2, RU3, or RU4 of the radio unit 300. For example, the radio unit 300 connected in a first cascade connection to a first port of a first layer splitter 200 may be assigned the unique port number of "0x6000" (D1). As another example, the radio unit 300 connected in a fourth cascade connection to a 16-th port of the first layer splitter 200 may be assigned the unique port number of "0x603F" (D2).

The management server 10 and the repeater apparatus 20 may the network address port translation table. Thus, the management server 10 may exchange data with each of the radio units 300 separately with reference to the network address port translation table.

The transfer unit 100 is assigned a representative IP address for a communication with an entity external to the repeater apparatus 20, e.g., the management server 10. The repeater apparatus 20 can transmit and receive packets to and from outside of the repeater apparatus 20 by use of the representative IP address of the transfer unit 100.

That is, the transfer unit 100 may receive a packet in which a destination IP address is the representative IP address among packets transmitted from the outside. Also, the transfer unit 100 may transmitting a packet to the outside by indicating the representative IP address as a source IP address.

Meanwhile, the layer splitter 200 has an internal IP address. The internal IP address is an IP address which is used only within the repeater apparatus 20. The use of the internal IP address enables to avoid the problem of IP address exhaustion problem.

As mentioned above, the unique port number enables to uniquely identify the radio unit 300 and the layer splitter 200 to which the radio unit 300 is connected. Thus, when the transfer unit 100 receives a packet in which the destination IP address is the representative IP address and the destination port number is one of the unique port numbers, the transfer unit 100 can identify the layer splitter 200 corresponding to the unique port number. Then, the transfer unit 100 changes the destination IP address from the representative IP address to the internal IP address of the identified layer splitter 200 and then transmits the packet to the internal network. Thus, the layer splitter 200 having the internal IP address can receive the packet according to the destination IP address.

Meanwhile, the radio unit 300 is assigned an internal IP address, for actual communication with the layer splitter 200, in addition to the internal port number of the layer splitter 200 to which the radio unit 300 is connected. In other words, The internal IP address and the internal port number may be used for the radio unit 300 to actually communicate with the layer splitter 200. The internal IP address and internal port number are used only within the repeater apparatus 20 and facilitates avoiding the problem of IP address exhaustion.

The layer splitter 200 may receive, from the transfer unit 100, a packet in which the destination IP address is the internal IP address of the layer splitter 200 itself and the internal port number is the unique port number. The layer splitter 200 can identify the radio unit 300 based on the unique port number indicated in the internal port number field in the received packet. Then, the layer splitter 200 changes the IP address in the destination IP address field into the internal IP address of the radio unit 300, and changes the unique port number in the internal port number field into the internal IP address of the radio unit 300. Subsequently, the layer splitter 200 transmits, through the internal network, the packet in which the destination IP address is the internal IP address of the radio unit 300 and the internal port number is an internal port number of the radio unit 300. Accordingly, the radio unit 300 having the destination IP address and the internal port number may receive the packet.

Meanwhile, the radio unit 300 may transmit host system information including base station information and connection information to the management server 10 according to a predetermined cycle. Here, the base station information includes physical cell identifier (PCI), distributed unit identifier (DU-ID), cell identifier (cell-ID), next generation NodeB identifier (gNB-ID), and the like. The connection information includes port information indicating the port to which the layer splitter 200 and the radio unit 300 are connected, and cascade information indicating a hop in which the radio unit 300 is disposed.

The radio unit 300 may generate a outbound packet containing a header in which the source IP address is the internal IP address of the radio unit 300, a source port number is the internal port number, the destination IP address is an IP address of the management server 10, and a destination port number is a port number of the management server 10 while containing the host system information in a payload, and transmits the generated outbound packet to the layer splitter 200.

The layer splitter 200 extracts the unique port number corresponding to the internal IP address and the internal port number of the radio unit 300 with reference to the network address port translation table, changes the source port number in the outbound packet from the internal port number to the unique port number, and changes the source IP address in the outbound packet from the internal IP address of the radio unit 300 to the internal IP address of the layer splitter 200. Then, the layer splitter 200 transmits the packet to the transfer unit 100.

The transfer unit 100 changes the source IP address in the packet from the internal IP address of the layer splitter 200 to the representative IP address. Then, the transfer unit 100 transmits the packet in which the source IP address is the representative IP address and the source port number is the unique port number. The packet will be transmitted to the management device 10 according to the destination IP address and the internal port number.

As described above, the exemplary embodiment of the present disclosure utilizes the network address port translation table in which each of the plurality of radio units 300 is assigned a unique port number for identifying the radio unit 300 and the layer splitter 200 to which the radio unit 300 is connected. Thus, the repeater apparatus 20 uses the representative IP address and the unique port number assigned in the network address port translation table in transmitting and receiving as address information of the transfer unit 100 while transmitting and receiving packets outside the repeater apparatus 20. In addition, the repeater apparatus 20 can route packets inside the repeater apparatus 20 by use of the internal IP address of the layer splitter 200, the internal IP address of the radio unit 300, and the internal port number connecting the layer splitter 200 to the lower layer distribution unit 300 which correspond to the unique port number. Therefore, the present disclosure can cope with the IP address exhaustion by allowing to discriminate a plurality of the radio units 300 during the communication using only a single IP address, i.e., the representative IP address. Also, the management device 10 can efficiently use the IP resources and manage the plurality of the radio units 300 separately using only a single IP address and the unique port numbers.

Figure 3:
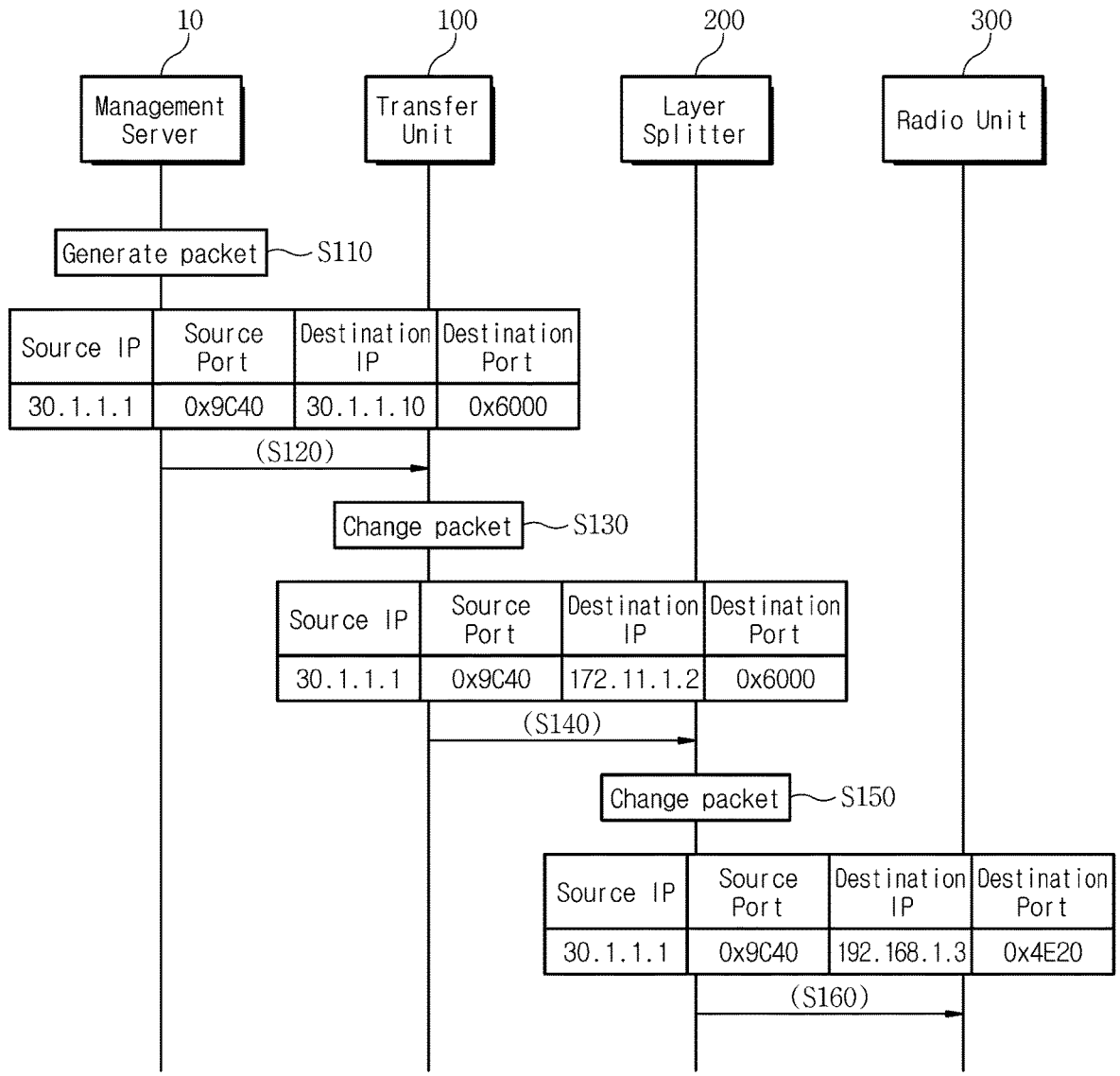
FIG. 3 is a flowchart illustrating a method of receiving data in a repeater apparatus according to an exemplary embodiment of the present disclosure.

Next, a data communication method in the repeater apparatus according to an exemplary embodiment of the present disclosure will be described. FIG. 3 is a flowchart illustrating a method of receiving data in the repeater apparatus according to an exemplary embodiment of the present disclosure.

The management server 10 generates a packet including data to be transmitted to the radio unit 300 in operation S110. The header of the packet includes the source IP address, the source port number, the destination IP address, and the destination port number. At this time, the management server 10 extracts the unique port number of the radio unit 300 from the network address port translation table. For example, it is assumed that the radio unit 300 to which the transmit data is addressed is a first radio unit 300#1 connected to the first layer splitter 300#1. Then, referring to the address port translation table of FIG. 2, the unique port number of the radio unit 300#1 is '0x6000' (i.e., 24576 in decimal). Also, it is assumed that the representative IP address of the transfer unit 100 connected to the radio unit 300#1 is '30.1.1.10'. The management server 10 generates a packet containing the unique port number '0x6000' (24576 in decimal) of the radio unit 300 in the internal port number field, and the representative IP address '30.1.1.1' of the transfer unit 100 connected to the radio unit 300 in the destination IP address field. The source IP address and the source port number of the packet contains the IP address (e.g., '30.1.1.1') and the port number (e.g., '0x9C40') of the management server 10, respectively. As mentioned above, the management server 10 transmits the generated packet to the transfer unit 100 in operation S120.

Upon receiving the packet, the transfer unit 100 identifies the radio unit 300 corresponding to the internal port number with reference to the network address port translation table, checks the layer splitter 200 to which the radio unit 300 is connected, and changes the destination IP address in the packet into the internal IP address of the layer splitter 200 in operation S130. Here, it is assumed that the internal IP address of the layer splitter 200 is '172.11.1.2'. As a result, the transfer unit 100 changes the destination IP address in the packet from '30.1.1.10' to the internal IP address '172.11.1.2' of the layer splitter 200. Then, the transfer unit 100 transmits the changed packet to the layer splitter 200 in operation S140.

After receiving the packet, the layer splitter 200 identifies the radio unit 300 corresponding to the internal port number with reference to the network address port translation table, changes the destination IP address in the packet into the internal IP address of the unit 300, and changes the internal port number of the packet into the internal port number used for actual communications between the layer splitter 200 and the radio unit 300 in operation S150. For example, it is assumed that the internal IP address of the radio unit 300 is '192.168.1.3', and the internal port number used for actual communications between the layer splitter 200 and the radio unit 300 is '0x4E20' (i.e., 20000 in decimal). As a result, the layer splitter 200 changes the destination IP address '172.11.1.2' of the packet into the internal IP address '192.168.1.3' of the radio unit 300, and changes the internal port number '0x6000' (24576 in decimal) of the packet into the internal port number '0x4E20' (20000 in decimal) used for actual communications between the layer splitter 200 and the radio unit 300. Subsequently, the layer splitter 200 transmits the changed packet to the radio unit 300 in operation S160. Accordingly, the radio unit 300 may receive the packet transmitted by the layer splitter 200.

Figure 4:
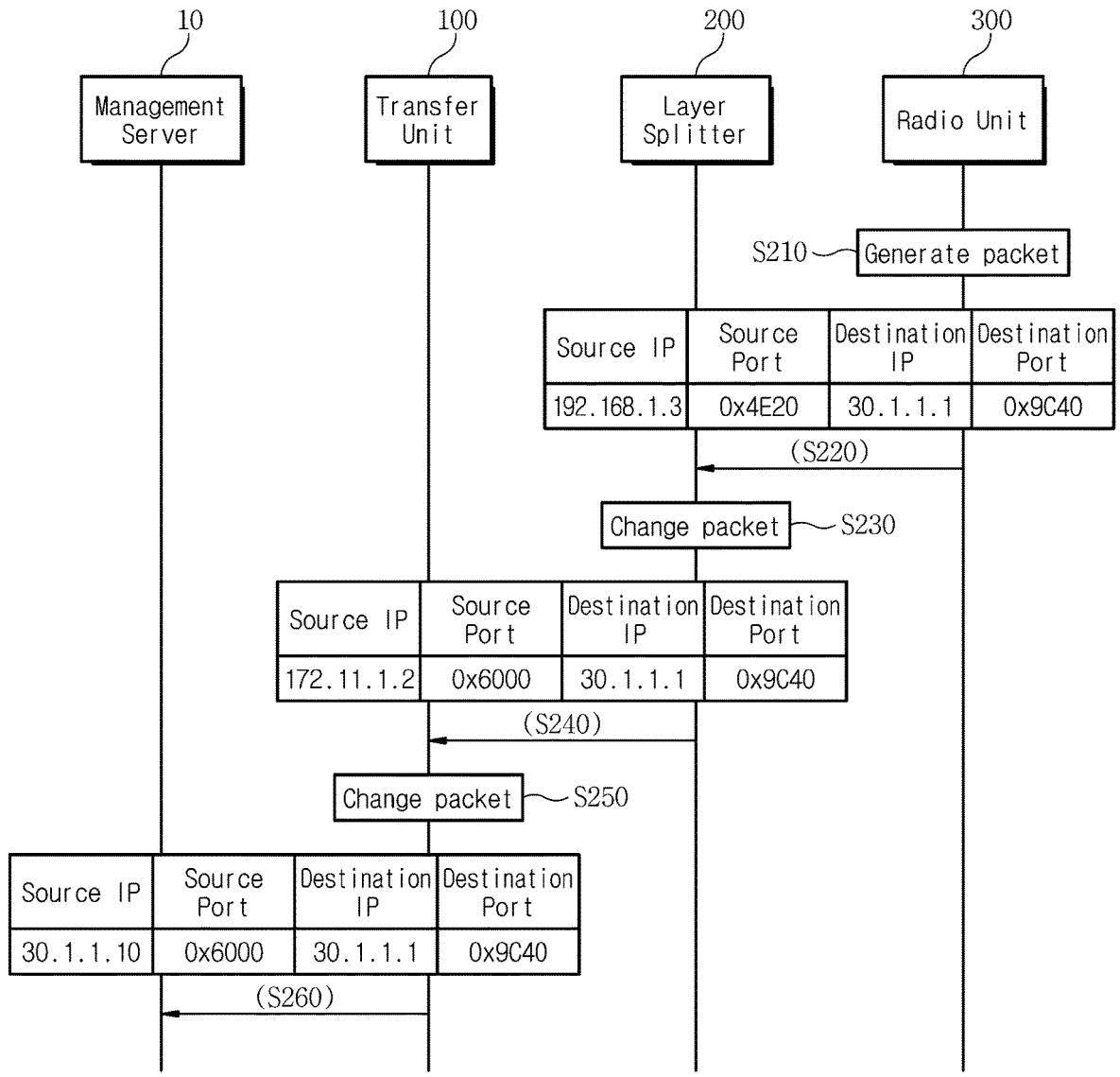
FIG. 4 is a flowchart illustrating a method of transmitting data in a repeater apparatus according to an exemplary embodiment of the present disclosure.

Next, a method of transmitting data in the repeater apparatus according to an exemplary embodiment of the present disclosure will be described. FIG. 4 is a flowchart illustrating a method of transmitting data in the repeater apparatus according to an exemplary embodiment of the present disclosure.

Referring to FIGS. 2 and 4, the radio unit 300 generates a packet to be transmitted to the management server 10 in operation S210. At this time, the payload of the packet may include the host system information. The host system information may include the base station information and the connection information. The base station information may include the physical cell identifier (PCI), the distributed unit identifier (DU-ID), the cell identifier (cell-ID), the gNB identifier (gNB-ID), and the like. The connection information may include the port information indicating the port through which the layer splitter 200 and the radio unit 300 are connected, and the cascade information indicating the hop in which the radio unit 300 is disposed.

In particular, the header of the packet includes the source IP address, the source port number, the destination IP address, and the destination port number. As a result, the radio unit 300 generates a packet containing the internal IP address assigned to the radio unit 300 itself in the source IP address field, the internal port number used for communications between the layer splitter 200 and the radio unit 300 in the source port number field, and the IP address and the port number of the management server 10 in the destination IP address and the destination port number fields, respectively. For example, it is assumed that the internal IP address of the radio unit 300 is '192.168.1.3' and the internal port number used for communications between the layer splitter 200 and the radio unit 300 is '0x4E20' (20000 in decimal). Also, it is assumed that the IP address and the port number of the management server 10 are '30.1.1.1' and '0x9C40' (i.e., 40000 in decimal). Then, the radio unit 300 generates the packet containing '192.168.1.3', '0x4E20' (20000 in decimal), '30.1.1.1', and '0x9C40' (40000 in decimal) for the source IP address, the source port number, the destination IP address, and the internal port number, respectively. Subsequently, the radio unit 300 transmits the generated packet to the layer splitter 200 in operation S220.

Upon receiving the packet, the layer splitter 200 identifies the radio unit 300 corresponding to the source port number with reference to the network address port translation table, changes the source port number in the packet from the internal port number of the radio unit 300 to the unique port number, and changes the source IP address from the internal IP address of the radio unit 300 to the internal IP address of the layer splitter 200 in operation S230. For example, in the network address port translation table of FIG. 2, the unique port number of the first radio unit 400#1 connected to the first layer splitter 300#1 is '0x6000' (24576 in decimal). Also, it is assumed that the internal IP address of the layer splitter 200 is '172.11.1.2'. As a result, the layer splitter 200 changes the source port number from the internal port number '0x4E20' of the radio unit 300 to the unique port number '0x6000' (24576 in decimal) according to the network address port translation table, and changes the source IP address from the internal IP address '192.168.1.3' of the radio unit 300 to the internal IP address '172.11.1.2' of the layer splitter 200. Then, the layer splitter 200 transmits the changed packet to the transfer unit 100 in operation S240.

After receiving the packet, the transfer unit 100 changes the source IP address in the packet from the internal IP address of the layer splitter 200 to the representative IP address of the transfer unit 100 in operation S250. For example, it is assumed that the representative IP address of the transfer unit 100 is '30.1.1.10'. Then, the transfer unit 100 changes the source IP address in the packet from the internal IP address '172.11.1.2' of the layer splitter 200 to the representative IP address '30.1.1.10' of the transfer unit 100. Subsequently, the transfer unit 100 transmits, to the management server 10, the packet in which the source IP address is the representative IP address of the transfer unit 100 and the source port number is the unique port number of the radio unit 300. Accordingly, the management server 10 receiving the packet can identify the radio unit 300 having transmitted the packet through the source port. Also, the management server 10 can store and manage the host system information received through the payload of the packet in correspondence with the identified radio unit 300. As described above, according to an embodiment of the present disclosure, the management device 10 can efficiently use the IP resources and manage the plurality of the radio units 300 separately using only a single IP address and the unique port numbers.

The method according to the exemplary embodiment of the present disclosure may be provided in the form of a computer-readable storage medium suitable for storing computer program instructions and data. The computer-readable storage medium may store program instructions, data files, data structures, and a combination thereof, and may include all kinds of recording devices capable of storing computer-readable data. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, and the flash memory, erasable and programmable ROM (EPROM), and electrically erasable and programmable ROM (EEPROM), all of which are hardware devices suitable for storing the computer program instructions and data. In addition, the computer-readable storage medium may be distributed over computer systems coupled through a network so that the computer readable code is stored and executed in a distributed fashion. The functional programs, codes, and code segments for implementing the present disclosure can be easily inferred based on the present specification by programmers in the technical field to which the present disclosure pertains.

The description set forth above is provided merely to illustrate exemplary embodiments of the disclosure but is not intended to limit the disclosure to specific configurations and functions. Those skilled in the art will be able to make adaptations, modifications, and variations on the examples without departing from the scope of the present disclosure.

The repeater apparatus according an exemplary embodiment of the present disclosure assigns a unique port number, to each of a plurality of the radio units, for identifying the radio unit and a layer splitter connected to the radio unit, and uses a representative IP address of a transfer unit and the unique port number as address information indicating locations of the plurality of the radio units during communications with external devices. Also, the repeater apparatus can route packets inside the repeater apparatus by using an internal IP address of the layer splitter and an internal IP address of the radio unit corresponding to the unique port number, and the internal port number of the port connecting between the layer splitter and the radio unit. Therefore, the present disclosure can cope with the IP address exhaustion problem by allowing to discriminate a plurality of the radio units 300 during the communication using only a single IP address, i.e., the representative IP address. Also, the management device 10 can efficiently use the IP resources and manage the plurality of the radio units 300 separately through the use of only a single IP address and the unique port numbers. The present disclosure is industrially applicable since it actually can be implemented obviously and has a sufficiently high possibility of commercialization or sales.

What is claimed is:

1. A method of transmitting and receiving data, comprising:
   receiving, by a transfer unit, an inbound packet including an IP address and a unique port number, as a port number, for uniquely identifying a specific radio unit and a specific layer splitter connected to the specific radio unit;
   changing, by the transfer unit, the inbound packet to an adjusted inbound packet by changing the IP address to an internal IP address of the specific layer splitter corresponding to the unique port number while maintaining the unique port number as the port number, and transmitting the adjusted inbound packet to the specific layer splitter identified by the unique port number; and
   receiving, by the specific layer splitter, the adjusted inbound packet from the transfer unit, changing the adjusted inbound packet to a re-adjusted inbound packet by changing the IP address to an internal IP address of the specific radio unit and changing the unique port number to an internal port number of the specific radio unit, and transmitting the re-adjusted inbound packet to the specific radio unit identified by the unique port number,
   wherein the unique port number is assigned according to:
      a specific cell number, of a plurality of cell numbers, corresponding to the specific layer splitter connected to the specific radio unit,
      a specific internal port number, of a plurality of internal port numbers, to which the specific layer splitter and the specific radio unit are connected, and
      a specific cascade number, of a plurality of cascade numbers associated with the internal port number.

2. The method of claim 1, wherein the inbound packet received by the transfer unit includes a representative IP address known to an outside as a destination IP address and the unique port number as the port number.

3. The method of claim 2, wherein changing the inbound packet to the adjusted inbound packet and transmitting the adjusted inbound packet to the layer splitter comprises:
   changing the destination IP address in the inbound packet from the representative IP address to the internal IP address of the layer splitter; and
   transmitting the adjusted inbound packet to the layer splitter.

4. The method of claim 2, wherein changing the adjusted inbound packet to the re-adjusted inbound packet and transmitting the re-adjusted inbound packet to the radio unit comprises:

changing the destination IP address and the port number in the adjusted inbound packet to an internal IP address and the internal port number, respectively, of the specific radio unit corresponding to the unique port number; and transmitting the re-adjusted inbound packet to the specific radio unit.

5. The method of claim 1, further comprising:

generating, by the radio unit, an outbound packet having an internal IP address and an internal port number used for actual communication with the layer splitter as a source IP address and a source port number, respectively, and transmitting the outbound packet;

changing, by the layer splitter, the source port number in the outbound packet to the unique port number and transmitting an adjusted outbound packet to the transfer unit; and changing, by the transfer unit, the source IP address in the adjusted outbound packet into a representative IP address and transmitting a re-adjusted outbound packet to an outside.

* * * * *